UNITED STATES PATENT OFFICE.

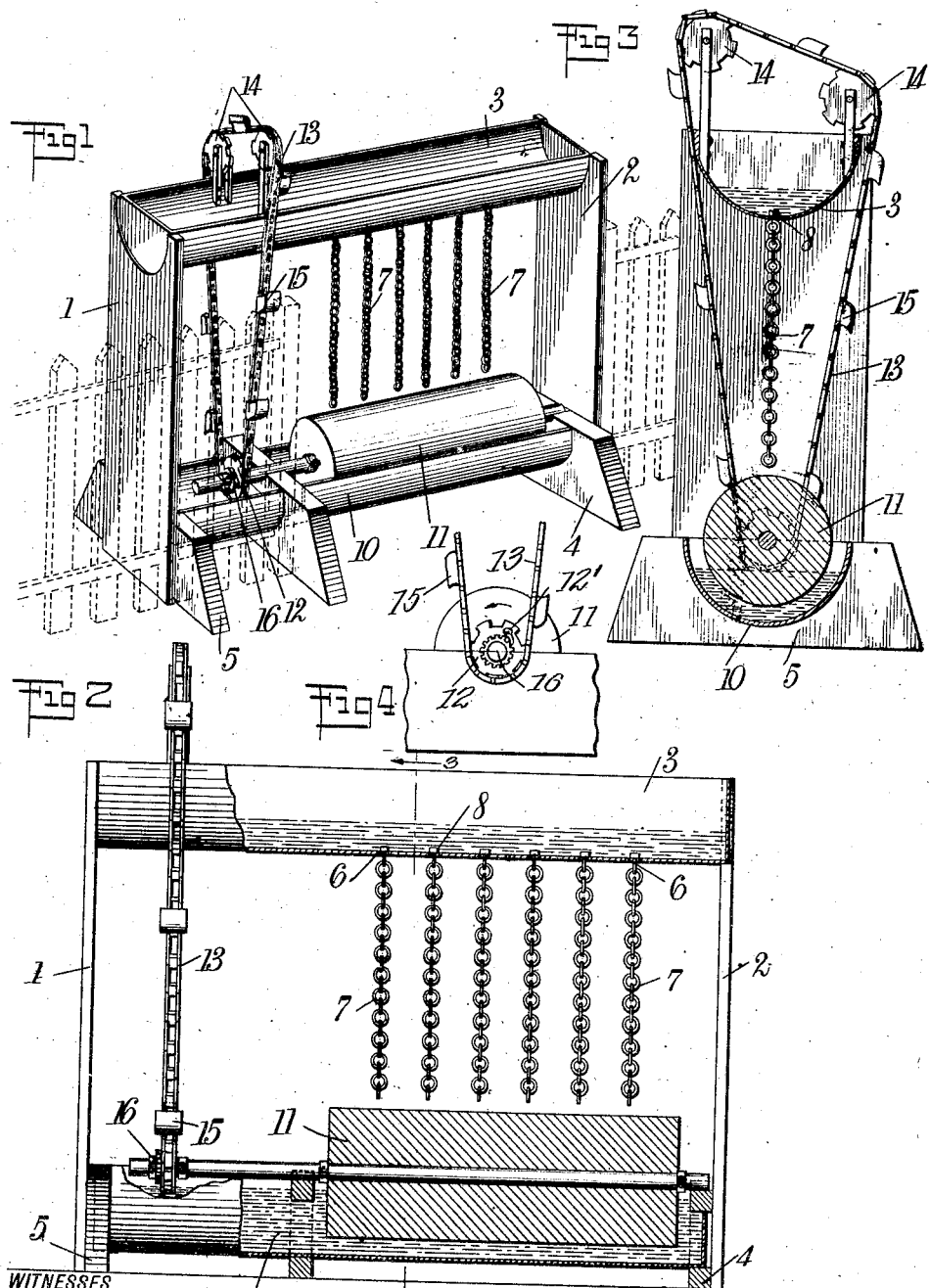

ALBERT W. APPLEGATE, OF BRAWLEY, CALIFORNIA.

DEVICE FOR EXTERMINATING VERMIN ON HOGS.

1,050,712.  Specification of Letters Patent.  Patented Jan. 14, 1913.

Application filed September 7, 1911. Serial No. 648,041.

*To all whom it may concern:*

Be it known that I, ALBERT W. APPLEGATE, a citizen of the United States, and a resident of Brawley, in the county of Imperial and State of California, have invented a new and Improved Device for Exterminating Vermin on Hogs, of which the following is a full, clear, and exact description.

My invention relates generally to devices to be used in the care of animals and more particularly it involves an apparatus especially adapted for exterminating vermin from hogs.

The object of my invention is to provide a device containing suitable oil or other material, the operation of the device providing for the application of a certain amount of this oil or other material to hogs in order to exterminate any vermin thereon, the device being adapted to be actuated by the animals themselves.

A further object of my invention is to provide a new and improved means for applying oil or other material to animals in order to exterminate any vermin present on them.

A further object of the invention is to provide a device of the class described comprising means adapted to be actuated by the animals themselves so that the passage of the animals therethrough will provide for the application of a certain amount of the oil or other material to them in order that they may be kept in a clean manner.

Reference is to be had to the accompanying drawings, forming a part of this specification, in which similar characters of reference denote corresponding parts, in all the views, and in which—

Figure 1 is a perspective view of my device in operative position; Fig. 2 is a side view thereof, partly in section; Fig. 3 is a vertical sectional view on the line 3—3 of Fig. 2.

The invention may assume a variety of forms, shapes and sizes and may be positioned in many ways when in use, the construction and position which I have shown in the drawings, however, being preferable, which construction preferably embodies uprights 1, 2, having a receptacle 3 adjacent the top and carried thereby, the uprights being secured in any suitable position against over-turning as by the bottom pieces 4, 5.

The device is positioned or set up within an opening in any suitable gate or other inclosure, the purpose being that as animals pass from one side of the gate to the other it is necessary for them to pass through the device.

The bottom of the receptacle 3 is provided with any desirable number of perforations 6, in which one end of suitable chains 7 are positioned, all of the chains depending downwardly from the receptacle, as shown in the drawings, the openings 6 in the receptacle, however, being larger than the end portion of the chain inserted therein, the chains being retained in such position by any suitable means such as pins or nuts 8; the receptacle 3 is adapted to contain a suitable quantity of oil or other exterminating liquid, the purpose of the chains and openings being that this oil or other liquid will trickle down the chains.

It is obvious that if the device is set up in the position already described and a number of animals, such as hogs, pass there-under, they will come into contact with the chains whereby the oil or liquid thereon will be deposited on them.

In order to avoid waste of the oil or other material and to provide for trickling thereof only when desired I have provided suitable means for conveying the oil or other liquid to the trough 3, such means being adapted to be actuated by the animals themselves. A suitable tank 10 is adapted to receive a supply of this oil or material and is positioned adjacent the bottom of the uprights so that the animals cannot pass thereunder; revolubly mounted within the tank is a cylinder or other suitable element 11 having thereon a sprocket 12 around which a chain 13 passes, the chain passing upwardly and over the receptacle 3 and being guided by means of other sprockets 14 positioned there-above. This chain carries a number of buckets 15 which convey the oil or other liquid present in the tank 10 to the receptacle 3 whenever the revoluble member is turned; in order to provide that the buckets shall operate only when the animals are passing in one direction therethrough I have provided a ratchet 16 on the shaft of the revoluble element 11, which ratchet engages a pawl on the lower sprocket 12.

It is to be noted that the revoluble element 11 is in contact with the liquid in the tank 10 so that as the animals pass over this revoluble element they will come in contact therewith and receive more or less of the liquid carried thereby. Thus the animals receive a sufficient quantity of the oil or liquid on all their parts so that their clean condition will be insured.

I have hereinbefore stated that the buckets 15 are elevated only during the passage of the animals over the revoluble element in one direction; I have found that if a number of animals pass through the device in one direction that sufficient liquid is elevated from the tank 10 into a trough 3 to provide for the animals when returning in the opposite direction through the device whereby no more liquid than is necessary is lifted into the trough. Of course, in place of the pawl and ratchet described, any suitable means can be used for lifting the buckets only when the revoluble element 11 is turned in one direction.

A quantity of the oil or liquid is placed in the tank 10 and the hogs in going between the chains 7 will turn the revoluble member 11, at the same time coming into contact therewith, other portions of the animals coming into contact with the chains whereby the oil or other liquid contained on the member 11 and the chains will be deposited on them. As the member 11 turns, the sprocket 12 thereon will actuate the chain 13, lifting the buckets 15, each of which contains a requisite amount of the oil, the buckets being turned upside-down in their passage over the receptacle 3 and depositing therein the oil carried by them. The oil in the receptacle 3 then finds its way down the chains 7. It is obvious that there is no need of the oil being carried on the chains when the device is not in use and that a saving of the oil will be effected by providing the revoluble member together with the chain and buckets as a means of transferring this oil from the tank 10 to the receptacle 3.

The device is capable of many changes and modifications in shape and size in order to adapt it to different conditions and circumstances, such changes being within the spirit and scope of the invention.

Having thus described my invention, I claim as new, and desire to secure by Letters Patent:—

1. A device of the class described comprising a receptacle, a number of elements depending therefrom, each of the elements communicating with the interior of the receptacle, a source of liquid supply, means for conveying a definite amount of liquid from the supply to the receptacle the liquid trickling down the said elements, the said conveying means being adapted to be operated by other means below the receptacle actuated by animals passing through the device.

2. A device of the class described comprising a receptacle, a number of elements depending therefrom, each of the elements communicating with the receptacle, a source of liquid supply, a chain having buckets thereon for conveying amounts of the liquid from the said supply to the receptacle, the liquid trickling down the said elements, together with means in engagement with the chain, below the receptacle, and adapted to be actuated by animals passing therethrough, whereby the device is operated.

3. A device of the class described comprising a receptacle, a number of elements depending therefrom, each of the elements communicating with the receptacle, a source of liquid supply, a chain having buckets thereon for conveying amounts of the liquid from the said supply to the receptacle, the liquid trickling down the said elements, a plurality of sprockets over which the chain passes, together with a revoluble element below the receptacle for moving the chain and adapted to be turned by animals passing thereover, whereby the device is operated.

4. A device of the class described comprising a receptacle, a number of elements depending therefrom, each of the elements communicating with the receptacle, a source of liquid supply, a chain having buckets thereon for conveying amounts of the liquid from the said supply to the receptacle, the liquid trickling down the said elements, a revoluble element, a sprocket actuated thereby, the chain passing around the sprocket, a pawl and ratchet between the element and the sprocket, the said revoluble element being adapted to be turned by animals passing thereover in one direction whereby the device is operated.

5. A device of the class described adapted to be positioned in an opening in a suitable gate or other inclosure and comprising uprights, a receptacle supported by the uprights, a revoluble member adjacent the bottom of the uprights and over which animals must pass, a number of elements depending from the said receptacle and communicating with the interior thereof, a chain having buckets thereon, a source of liquid supply, the buckets passing through the said supply, means actuated by the revoluble element when it is turned for lifting the buckets and conveying a suitable amount of liquid to the receptacle, the liquid trickling down the said element whereby animals passing through the device actuate the same and have an amount of the said liquid applied to them.

6. A device of the class described adapted to be set up within an opening in a gate and comprising uprights, a receptacle supported by the uprights adjacent their top, a revoluble member supported adjacent the bottom of the uprights, a chain having buckets thereon passing over the receptacle, a source of liquid supply through which the said buckets pass, means for supporting the chains and buckets in position, the said means being in operative relation with the said revoluble element, a plurality of elements depending from the receptacle and communicating with the interior thereof, whereby animals passing over the said revoluble element will actuate the same whereby the liquid is supplied to the said receptacle, the liquid passing down the said elements and being deposited on the animals as they pass through the device.

In testimony whereof I have signed my name to this specification in the presence of two subscribing witnesses.

ALBERT W. APPLEGATE.

Witnesses:
T. F. GREEN,
J. COLE BAIRD.